(12) United States Patent
Mizuta et al.

(10) Patent No.: US 7,492,068 B2
(45) Date of Patent: Feb. 17, 2009

(54) POSITIONING MEMBER AND VOLTAGE CONTROL DEVICE FOR VEHICLE ALTERNATOR HAVING THE POSITIONING MEMBER

(75) Inventors: Kennichi Mizuta, Toyoake (JP); Kazuyuki Watanabe, Takahama (JP); Tomohiko Hamada, Kariya (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 11/478,655

(22) Filed: Jul. 3, 2006

(65) Prior Publication Data
US 2007/0046113 A1 Mar. 1, 2007

(30) Foreign Application Priority Data
Aug. 23, 2005 (JP) .............................. 2005-240518

(51) Int. Cl.
H02K 11/04 (2006.01)
(52) U.S. Cl. ........................ 310/71; 310/68 D
(58) Field of Classification Search .................. 310/43, 310/68 D, 68 R, 71, 89, 91
See application file for complete search history.

(56) References Cited

U.S. PATENT DOCUMENTS

| 5,821,674 | A | * | 10/1998 | Weiner ..................... 310/68 D |
| 6,294,851 | B1 | * | 9/2001 | Matsuyama et al. ........... 310/43 |
| 6,724,108 | B2 | * | 4/2004 | Nakano ..................... 310/68 D |
| 6,731,031 | B2 | * | 5/2004 | Sarkar et al. ............... 310/68 D |
| 6,784,576 | B2 | * | 8/2004 | Nguyen ..................... 310/68 D |
| 6,864,603 | B2 | * | 3/2005 | Yamazaki et al. ............. 310/53 |
| 6,867,517 | B2 | * | 3/2005 | Kumagai .................... 310/68 D |
| 2004/0155540 | A1 | * | 8/2004 | Nakamura et al. ........ 310/68 D |
| 2004/0217663 | A1 | * | 11/2004 | Kumagai ..................... 310/71 |
| 2005/0168082 | A1 | * | 8/2005 | Kondo et al. .............. 310/68 D |
| 2005/0184526 | A1 | * | 8/2005 | Sakurai ....................... 290/32 |
| 2006/0097704 | A1 | * | 5/2006 | Deverall et al. ............. 323/201 |
| 2006/0186747 | A1 | * | 8/2006 | Regnard et al. ............... 310/71 |

FOREIGN PATENT DOCUMENTS

| JP | 09074727 | * | 3/1997 |
| JP | 2000-061947 A | | 2/2000 |
| JP | 2000061947 A | * | 2/2000 |

* cited by examiner

Primary Examiner—Tran N Nguyen
(74) Attorney, Agent, or Firm—Oliff & Berridge, PLC

(57) ABSTRACT

A voltage control device for vehicle alternator has an IC chip as an electric component for controlling electric circuits, terminals connected electrically to the IC chip for controlling electric circuits, a resin case in which the terminals are formed by insert molding, and a terminal exposure portion of a hole shape, formed in a part of the resin case, corresponding to a positioning pin for positioning the terminals. A projection part as a positioning member of a wall shape is formed in the surroundings of the terminal exposure portion and on the surface of the resin case.

20 Claims, 4 Drawing Sheets

WATER

NOT MORE THAN 180°

WATER

POSITIONING MEMBER AND VOLTAGE CONTROL DEVICE FOR VEHICLE ALTERNATOR HAVING THE POSITIONING MEMBER

CROSS-REFERENCE TO RELATED APPLICATIONS

This application is related to and claims priority from Japanese Patent Application No. 2005-240518 filed on Aug. 23, 2005, the contents of which are hereby incorporated by reference.

BACKGROUND OF THE INVENTION

1. Field of the Invention

The present invention relates generally to a terminal positioning member and a voltage control device (as a regulator) for vehicle alternator having the positioning member capable of controlling an output voltage from a vehicle alternating current (AC) generator, in particular, relates to a positioning member for positioning terminals applicable to various vehicle devices such as a voltage control device for vehicle as a regulator.

2. Description of the Related Art

A vehicle alternator is equipped with a voltage control device, namely, a regulator for controlling the output voltage from the vehicle alternator. The regulator includes electric components therein such as mold integral circuits (ICs) that are sealed in a regulator protective case or a protective pack. In particular, electric terminals are positioned and then sealed in the regulator protective case by performing insert molding. A part of each electric terminal is protruded to the outside of the regulator protective case and is exposed to the outside atmosphere.

On performing the insert molding for sealing the electric terminals, it is necessary to fix the position of each electric terminal accurately at a specified position in the regulator protective case by using a positioning pin. The positioning pin is a positioning member.

FIG. 7 is a diagram showing a concrete example of the configuration of a typical conventional regulator (as the voltage control device) and FIG. 8 is a sectional diagram of the regulator along the line VII-VII in the configuration shown in FIG. 7.

As shown in those FIG. 7 and FIG. 8, the terminals 110 are formed by the insert molding in the regulator protective case 100. Because the insert molding for the electric terminals 110 is performed while the positioning pin (not shown) pushes a part of each electric terminal 110 through a positioning hole 120 that is also a positioning member. After the completion of the insert molding process, the positioning pin (not shown) is removed from the regulator protective case 100. As a result, the hole 120 as the positioning member is remained in the cured regulator protective case 100 after the completion of the insert molding process and the positioning pin has already been removed from the regulator protective case 100. Further, the part of each electric terminal 110 is exposed to the outside atmosphere through the bottom of the hole 120. If rainwater or washing water invades into the hole 120, the electric terminals 110 are corroded by the water because a current flows between the water at the bottom of the hole 120, the electric terminal 110, and other electric components made of metal, each of those is a different voltage potential from the voltage potential of the electric terminals 110. Finally, the electric terminals are broken by corrosion. Thus, the presence of the hole 120 (as the positioning member) in the regulator protective case 100 is liable to electrolytic corrosion.

In order to prevent or avoid the occurrence of electrolytic corrosion by the invasion of the water into the hole 120, there are well known manners such as the inserting mold method in which the hole 120, through which a part of the electric terminal 110 is exposed to the outside atmosphere, is covered with insulation member.

The Japanese patent laid open publication No. JP-2000-61947 has disclosed such a conventional manner of positioning the electric terminals in a mold using insulating member while contacting the insulating member to the mold so as not to expose the electric terminal to the outside atmosphere, and, finally filling melted molding resin into the mold. This conventional method provides the regulator in which the electric terminals and the insulating member are inserted together in the regulator protective case.

However, because such a conventional method described above needs the additional process of setting the insulating member into the mold during the manufacturing process of the regulator, the manufacturing productivity thereby drops by the additional manufacturing step, and the manufacturing cost increases by adding the insulating member.

SUMMARY OF THE INVENTION

It is an object of the present invention to provide a positioning member and a voltage control device for vehicle alternator having the positioning member with highly manufacturing productivity and low manufacturing cost.

To achieve the above purposes, the present invention provides a positioning member to be used in positioning having a terminal exposure portion being a concave portion formed on a part of a case covering an electric device, and a projection part being a wall shape formed in the surrounding of the terminal exposure portion and on the surface of the case.

Further, the present invention also provide a voltage control device for vehicle alternator has electric components, terminals connected electrically to the electric components, a resin case in which the terminals are formed in insert molding, and positioning member.

The positioning member has a terminal exposure portion and a projection part. The terminal exposure portion is a concave portion formed on a part of the resin case, for use in positioning the terminals in the resin case. The projection part is a wall shape formed in the surrounding of the terminal exposure portion and on the surface of the resin case.

By forming the projection part of a wall shape in the surrounding of the terminal exposure portion as the positioning member, it is possible to prevent the invasion of water into the concave portion as the terminal exposure portion. It is thereby possible to eliminate additional components and any additional step of adding insulating member so that the terminals are not exposed. This can increase the manufacturing productivity and prevent the rise of manufacturing cost.

Further, it is preferred that the projection part as the positioning member and the resin case are formed in one body. This prevents the invasion of water into the terminal exposure portion by changing the more shape of the resin case mold, and prevents adding any additional parts.

Still further, it is preferred that the projection part has a cylindrical shape or a tube of a polygon shape. When the projection part has a cylindrical shape or a polygon shape, it is possible to cover the entire of the terminal exposure portion as the positioning member with the projection part and to prevent the invasion of water into the terminal exposure portion certainly.

Still furthermore, it is preferred that the projection part as the positioning member has a cylindrical shape having a notch at an angle of not more than 180 degrees has continuous plural planes formed in surrounding of the terminal exposure portion. It is thereby possible to prevent certainly the invasion of water into the terminal exposure portion along specified direction.

Still further, it is preferred that the vehicle alternator has the rear cover made of metal whose voltage potential is different from the voltage potential of the terminals and the projection part is protruded from the resin case toward the rear cover. It is thereby possible to prevent reaching water from the rear cover into the terminal exposure portion.

Moreover, it is preferred that one surface of the resin case on which the projection part as the positioning member is formed is arranged in a direction vertically to the ground under the vehicle alternator is mounted on a vehicle. It is thereby possible to prevent certainly the invasion of water, dropping along the direction from the ceiling to the ground, into the terminal exposure portion.

Still further, it is preferred that the projection part as the positioning member is formed at an upper portion of the terminal exposure portion in order to cover the terminal exposure portion along water flow onto the surface of the resin case under the vehicle alternator is mounted on a vehicle. It is thereby possible to prevent certainly the invasion of water flowing from a specified direction into the terminal exposure portion.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
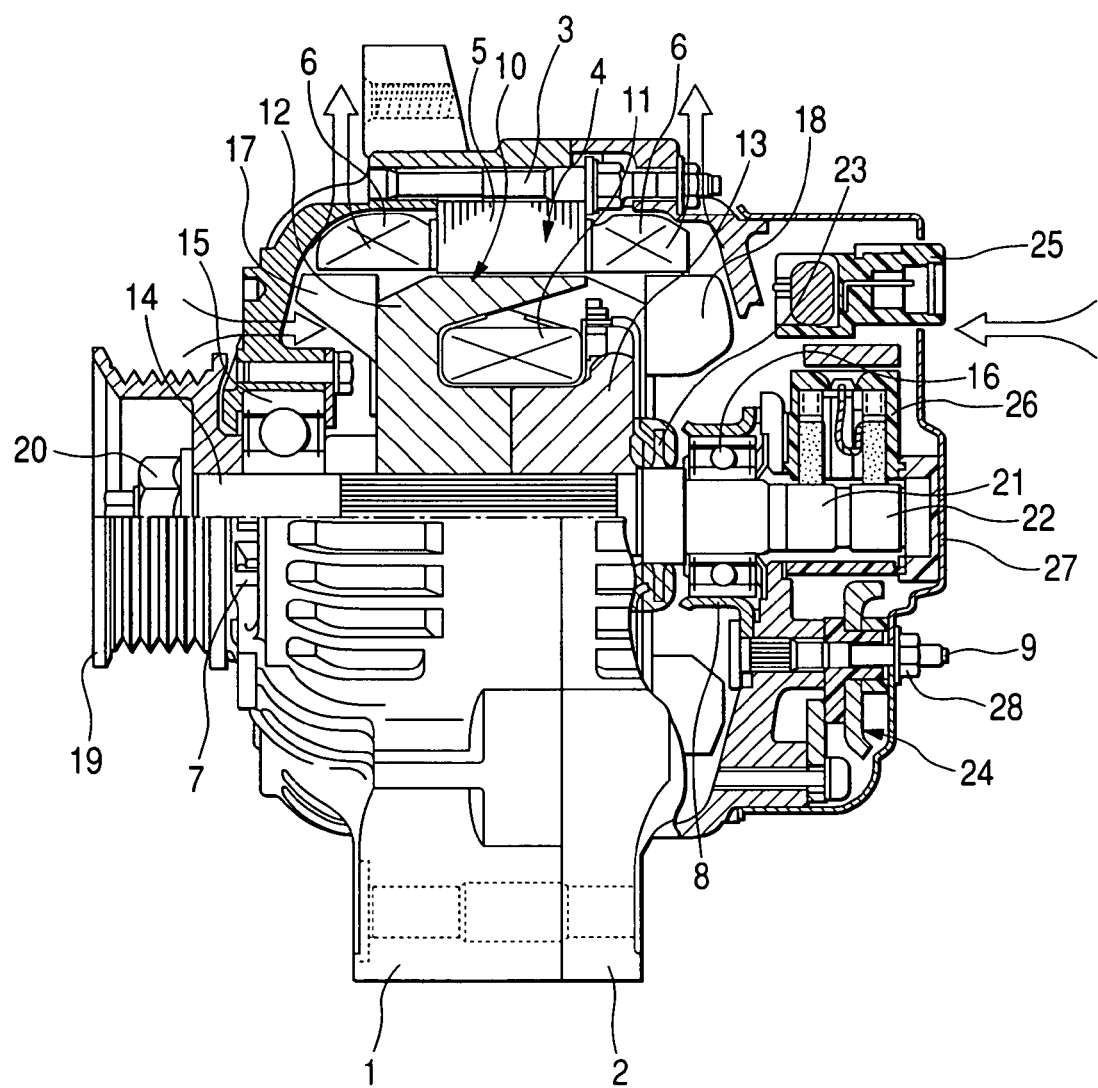
FIG. 1 is a sectional diagram showing the entire configuration of a vehicle alternator equipped with a regulator as a voltage control device according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will now be given of a voltage control device having a positioning member to be applied to a vehicle alternator according to the present invention with reference to drawings. However, the concept of the present invention can be applied to various electric devices such as an alternating current motor such as a stator and other electric devices to be incorporated in movable bodies such as a vehicle.

FIG. 1 is a sectional diagram showing the entire configuration of a vehicle alternator (AC generator) equipped with a regulator (as the voltage control device) having an improved positioning member according to an embodiment of the present invention.

As shown in FIG. 1, the vehicle alternator comprises a front frame 1, a rear frame 2, a stator 4, a rotor 10, a rectifier unit 24, a regulator 25 (as the voltage control device), a brush unit 26, and a rear cover 27.

Both the front frame 1 and the rear frame 2 have a bracket shape and fastened to each other by plural bolts 3 while contacting opening parts of both the front frame 1 and the rear frame 2 to each other. The stator 4 is fixed to the inner peripheral wall of the front frame 1. The front frame 1 and a cylindrical bearing box 7 are assembled in one body. A bearing box 8 made of iron is attached to the rear frame 2 by knurling bolts 9.

The stator 4 has a stator core 5 and stator windings 6. The rotor 10 has field windings 11, pole cores 12 and 13, a shaft 14, and the like. The rotor 10 rotates freely while supported by a pair of bearings 15 and 16 that are fixed to bearing boxes 7 and 8.

The cooling fans 17 and 18 are attached to the end surface of each of the pole cores 12 and 13 in its axis direction. Blades of the cooling fan 17 are inclined to the rotational direction of the rotor 10 in order to generate cooling wind to the field windings 11.

A pulley 19 is connected and attached to the front end of the shaft 14 by nuts 20 and driven by an engine mounted on a vehicle through belts. The engine, the vehicle, and the belts are omitted from the drawings. A pair of slip rings 21 and 22 is mounted on the rear end of the shaft 14 that is positioned at the outer peripheral of the rear frame 2 and connected electrically to the field windings 11 through an electrical conductor 23.

The electrical components such as the rectifier unit 24 as the rectifier device, the regulator 25 as the voltage control device, and the brush unit 26 are fixed along the axis direction to the end surface of the outer peripheral part of the rear frame 2 by bolts 9 as fixing means. The rectifier unit 24 rectifies the three phase alternate current (AC) voltage, which is generated from the three phase stator windings 6, and the direct current (DC) voltage is acquired. The regulator 25 as the voltage control device controls the output voltage of the vehicle alternator by regulating the exciting current which flows to the field windings 11.

Through the brush unit 26, the exciting current flows from the rectifier unit 24 to the field windings 11 of the rotor 10. The brush unit 26 has brushes that push slip rings 21 and 22 formed on the shaft 14 of the rotor 10.

The rear cover 27 is made of metal, and covers and protects the electrical components such as the rectifier unit 24, the regulator 25, the brush unit 26, and the like. Those electric components are mounted on the outer peripheral part of the rear frame 2.

The rear cover 27 is fixed to the rear frame 2 by the nuts 28 and the bolts 9 extending form the rear frame 2. The rectifier unit 24 is fixed between the rear frame 2 and the rear cover 27.

The rear cover 27 has cooling-wind introduction openings of concentric circle shape through which the cooling wind flows in and out.

Next, a description will now be given of the configuration of the regulator 25 having the improved positioning member according to the embodiment in detail.

Figure 2:
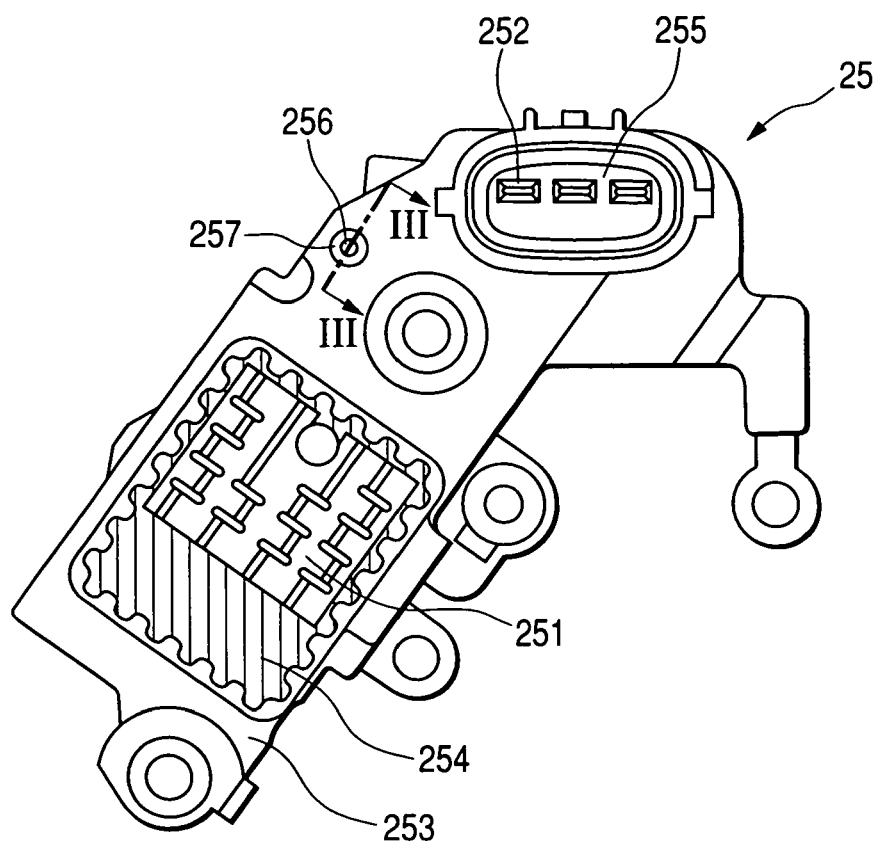
FIG. 2 is a plan view of the voltage control device having a projection part as an improved positioning member in the vehicle alternator shown in FIG. 1.
Figure 3:
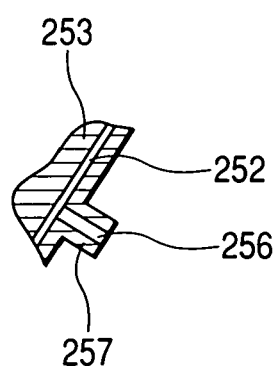
FIG. 3 is a sectional view of the projection part in the voltage control device along the line III-III shown in FIG. 2.

FIG. 2 is a plan view of a configuration of the regulator 25 having the improved positioning member, to be mounted on the vehicle alternator shown in FIG. 1. FIG. 3 is a sectional view of a projection part as the positioning member formed in the regulator 25 along the line III-III shown in FIG. 2.

The regulator 25 as the voltage control device according to the embodiment of the present invention has a control IC chip 251 as an electric component, the three terminals 252 connected to the control IC chip 251, and a sealing resin case 253 in which the terminals 252 are formed by the insert molding. The control IC chip 251 is sealed in the resin case 253 with a sealing resin 254 such as silicon in order to protect it from water.

The resin case 253 has a connector section 255 through which the IC chip 251 is electrically connected to vehicle connectors (omitted from drawings). A part of the terminals 252 formed by the insert molding is exposed to the outer atmosphere at the connector section 255 and the IC chip 251 is electrically connected to the connector section 255 through the terminals 252.

A part of the resin case 253 has a terminal exposure portion 256 (as the positioning member) of a concave shape or a hole shape corresponding to a positioning pin (not shown) for positioning the terminals 252 in the resin case 253. The positioning for the terminals 252 in the resin case 253 is carried out by molding the resin case 253 by the insert molding for the terminals 252 contacted to the terminals 252 to the front part of the positioning pin (not shown).

A wall-shaped projection part 257 (as the positioning member) is formed at the outer surface of the resin case 253 and at the peripheral portion of the terminal exposure portion 256. The projection part 257 and the resin case 253 are formed in one body. The projection part 257 is formed as it projects from the resin case 253 to the rear cover 27. The rear cover 27 is a ground voltage potential level, and on the contrary, the terminals 252 have different voltages corresponding to the battery voltage level based on various control signals. In the normal operation, those voltages at the terminals 252 have different voltage potentials. On mounting on a vehicle, one end surface of the resin case 253 having the projection part 257 in the regulator 25 is placed approximately vertical to the ground surface.

Thus, it is possible to prevent the invasion of water into the terminal exposure portion 256 (as the positioning member) by forming the projection part 257 (as the positioning member) of a wall shape formed in the surrounding of the terminal exposure portion 256, and the terminal exposure portion 256 is formed in the resin case 253 of the regulator 25. Accordingly, it can be eliminate the manufacturing step of adding insulating member and also eliminate the necessity of additional parts such as the insulating member so that the terminals 252 are not exposed to the outer atmosphere, in order to prevent any occurrence of a galvanic corrosion and breaking wire of the terminals 252 by the invasion of rainwater or washing water accumulated between the terminals 252 and components having a voltage potential different from the voltage potential of the terminals 252 exposed through the terminal exposure portion 256. This can increase the manufacturing productivity and prevent the rise of manufacturing cost of the voltage control device for vehicle alternator.

In addition, when both the projection part 257 (as the positioning member) and the resin case 253 are formed in one body, it is possible to prevent the invasion of water into the terminal exposure portion 256 (as the positioning member) by changing the mere shape of the resin case 253. This needs no additional components.

Furthermore, when the projection part 257 (as the positioning member) has a cylindrical shape, the entire peripheral part of the terminal exposure portion 256 is covered with the projection part 257 and this can prevent the invasion of water into the terminal exposure portion 256 certainly.

Furthermore, when a part of the projection part 257 is projected from the resin case 253 toward the rear cover 27 made of metal, it is possible to prevent water reaching into the terminal exposure portion 256 from the rear cover 27. In particular, when the regulator having the terminal exposure portion 256 having the projection part 257 is mounted on a vehicle alternator incorporated in a vehicle, because one surface of the resin case 253 having the projection part 257 is faced in approximate vertical direction to the ground, it is possible to prevent the occurrence of the invasion of water dropping from the ceiling of the vehicle to the ground certainly.

The present invention is not limited by the embodiment described above, it is possible to provide various modified embodiments within the scope of the concept of the present invention. For example, although the above embodiment provides the projection part 257 (as the positioning member) of a cylindrical shape, it is possible to form it with other shape.

Figure 4:
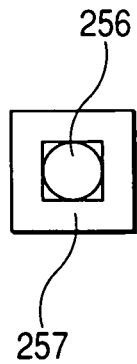
FIG. 4 is another configuration of a projection part, as the positioning member, in the voltage control device in the voltage control device according to the embodiment.
Figure 5:
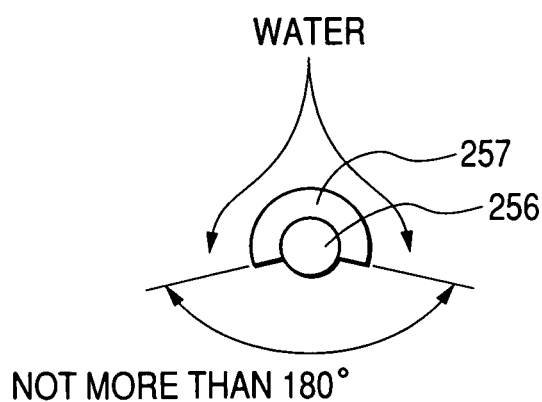
FIG. 5 is another configuration of a projection part, as the positioning member, in the voltage control device in the voltage control device according to the embodiment.
Figure 6:
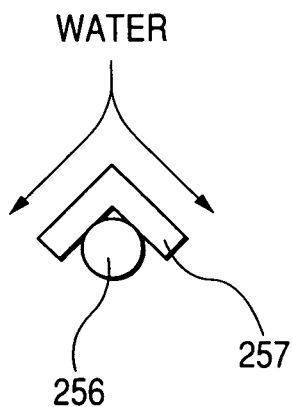
FIG. 6 is another configuration of a projection part, as the positioning member, in the voltage control device in the voltage control device according to the embodiment.
Figure 7:
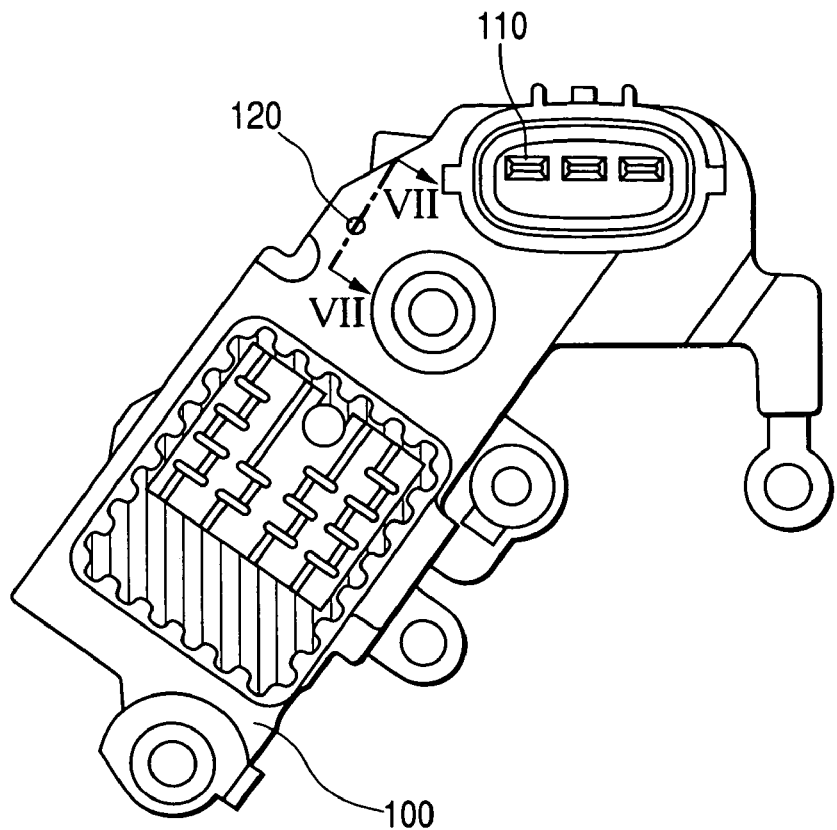
FIG. 7 is a sectional diagram of a regulator as a voltage control device having a conventional positioning member incorporated in a vehicle alternator.
Figure 8:
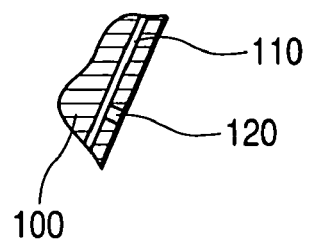
FIG. 8 is a sectional view of the conventional positioning member as a part of the regulator along the line VIII-VIII shown in FIG. 7.

FIG. 4 to FIG. 6 are diagrams showing various configuration of modified projection part 257. That is, it is possible to form the projection part 257 (as the positioning member) with a tube of a polygon shape. FIG. 4 shows projection part 257 of a tube of a square shape.

The projection part 257 formed with a tube of a polygon shape can prevent the invasion of water into the terminal exposure portion 256 certainly because the entire peripheral part of the terminal exposure portion 256 can be covered with the projection part 257 of a tube of a polygon shape, just like the projection part 257 with a cylindrical shape.

Furthermore, as shown in FIG. 5, it is possible to form the projection part 257 with a cylindrical shape having a notch at an angle of 180 degrees or less. Still furthermore, as shown in FIG. 6, it is possible to form the projection part 257 with continuous plural planes around the terminal exposure portion 256. This can prevent certainly the invasion of water into the terminal exposure portion 256 in specified direction.

In particular, the projection part 257 having the configuration shown in FIG. 5 or FIG. 6 can cover at least the upper part of the terminal exposure portion 256 in water dropping direction to the surface of the resin case 253. This configuration can prevent the invasion of water flowing, in one direction, into the terminal exposure portion 256 certainly.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A voltage control device for vehicle alternator comprising:

an electric component;

terminals connected electrically to the electric component;

a connector section in which end parts of the terminals, through which the terminals are configured to be electrically connected to terminals of an outside device, are exposed;

a resin case in which the terminals are formed in insert molding; and a positioning member having a terminal exposure portion and a projection part, the terminal exposure portion being a concave portion formed on a part of the resin case separate from the connector section, the terminal exposure portion and the projection part being formed between the electric component and the end parts of the terminals, the positioning member for use in positioning the terminals in the resin case, and the projection part being a wall shape surrounding the terminal exposure portion on the surface of the resin case.

2. The voltage control device for vehicle alternator according to claim 1, wherein the projection part and the resin case are formed in one body.

3. The voltage control device for vehicle alternator according to claim 1, wherein the projection part has a cylindrical shape.

4. The voltage control device for vehicle alternator according to claim 2, wherein the projection part has a cylindrical shape.

5. The voltage control device for vehicle alternator according to claim 1, wherein the projection part is a tube of a polygon shape.

6. The voltage control device for vehicle alternator according to claim 2, wherein the projection part is a tube of a polygon shape.

7. The voltage control device for vehicle alternator according to claim I, wherein the projection part has a cylindrical shape having a notch at an angle of not more than 180 degrees.

8. The voltage control device for vehicle alternator according to claim 2, wherein the projection part has a cylindrical shape having a notch at an angle of not more than 180 degrees.

9. The voltage control device for vehicle alternator according to claim 1, wherein the projection part has continuous plural planes formed in surrounding of the terminal exposure portion.

10. The voltage control device for vehicle alternator according to claim 2, wherein the projection part has continuous plural planes formed in surrounding of the terminal exposure portion.

11. The voltage control device for vehicle alternator according to claim 1, wherein the vehicle alternator is equipped with a rear cover made of metal of a voltage potential that is different from a voltage potential of the terminals, and the projection part is protruded from the resin case toward the rear cover.

12. The voltage control device for vehicle alternator according to claim 2, wherein the vehicle alternator is equipped with a rear cover made of metal of a voltage potential that is different from a voltage potential of the terminals, and the projection part is protruded from the resin case toward the rear cover.

13. The voltage control device for vehicle alternator according to claim 1, wherein one surface of the resin case on which the projection part is formed is arranged in a direction vertically to the ground under the vehicle alternator as mounted on a vehicle.

14. The voltage control device for vehicle alternator according to claim 2, wherein one surface of the resin case on which the projection part is formed is arranged in a direction vertically to the ground under the vehicle alternator as mounted on a vehicle.

15. The voltage control device for vehicle alternator according to claim 1, wherein the projection part is formed at an upper portion of the terminal exposure portion in order to cover the terminal exposure portion along water flow onto the surface of the resin case under the vehicle alternator as mounted on a vehicle.

16. The voltage control device for vehicle alternator according to claim 2, wherein the projection part is formed at an upper portion of the terminal exposure portion in order to cover the terminal exposure portion along water flow onto the surface of the resin case under the vehicle alternator as mounted on a vehicle.

17. A positioning member for positioning terminals disposed in a resin case which covers a voltage control device, comprising:

a terminal exposure portion being a concave portion; and a projection part of a wall shape surrounding the terminal exposure portion, formed on the terminals at a position between an electric component embedded in the resin case and end parts of the terminals exposed at a connector section, wherein, the terminal exposure portion and the projection part are separate from the connector section.

18. The voltage control device for vehicle alternator according to claim 1, wherein the terminals do not extend into the projection part.

19. The positioning member according to claim 17, wherein the terminals do not extend into the projection part.

20. The voltage control device for vehicle alternator according to claim 1, wherein the terminals are exposed at the terminal exposure portion at a location along the terminals that is between (a) a location where the terminals enter the resin case from the connector section and (b) a location where the terminals are connected to the electric component.

* * * * *